R. HATRICK.
Tire-Tightener.
No. 47,718
Patented May 16, 1865.
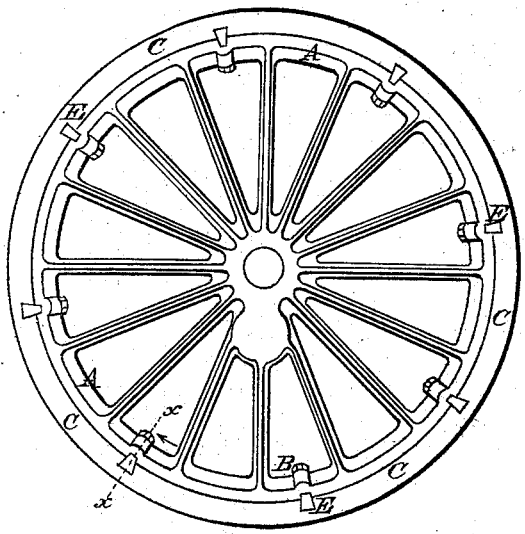
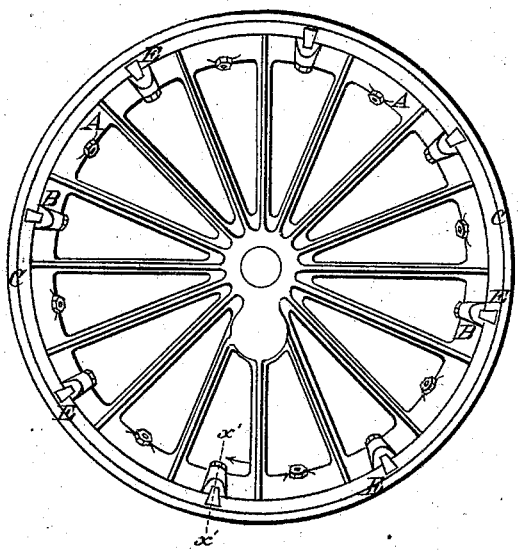
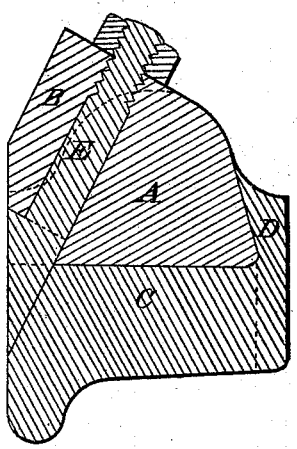
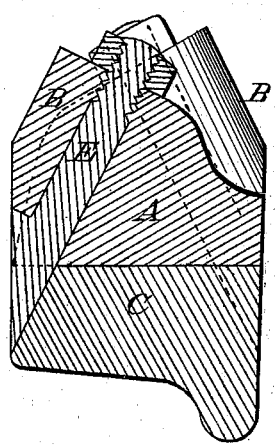
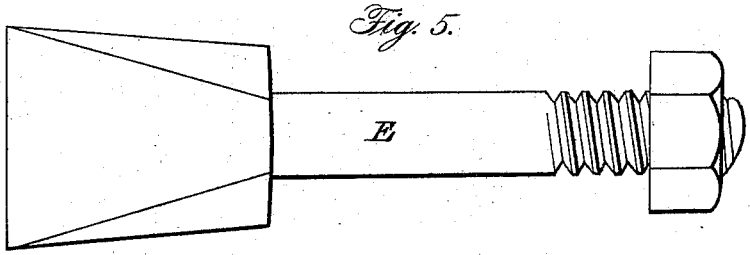
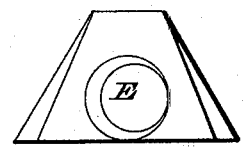
Witnesses:
Chas. E. Hore
James T. Graham
Inventor:
Robert Hatrick
By Thos. D. Howe Atty
AM. PHOTO-LITHO. CO. N.Y. (OSBORNE'S PROCESS.)

UNITED STATES PATENT OFFICE.

ROBERT HATRICK, OF PATERSON, NEW JERSEY.

IMPROVED TIRE-FASTENER.

Specification forming part of Letters Patent No. 47,718, dated May 16, 1865.

*To all whom it may concern:*

Be it known that I, ROBERT HATRICK, of Paterson, in the county of Passaic and State of New Jersey, have invented a certain Improvement in Securing Tires to Locomotive-Wheels, of which the following is a specification.

My invention has reference to the manner of securing the tire to locomotive-wheels; and it consists in passing the bolts obliquely through the tire and felly, and in wedging and in dovetailing the heads of the bolts into the tire and into both tire and felly, as hereinafter more fully described.

In the drawings, Figure 1 is an inside view of a wheel with my improvement when the tire is made with a flange. Fig. 2 is an outside view of a wheel with my improvement when the tire is made without a flange. Fig. 3 is a section of the tire, felly, and bolt through the line $x\ x$, Fig. 1, looking to the left. Fig. 4 is a section of the tire, felly, and bolt through the line $x'\ x'$, Fig. 2, looking to the left. Fig. 5 is a top view of the bolt and nut. Fig. 6 is a front end view of the same, the nut being removed.

A is the felly of the wheel, which is made with projections or enlargements B at the points where it is intended that the bolts shall pass through.

C is the tire, which is made either with a flange, D, as represented in Figs. 1 and 3, or without said flange, as represented in Figs. 2 and 4. When the tire is made with the flange D, all the bolts should pass through in such a way that their heads may all be on the side of the wheel opposite to the said flange D, as represented in Fig. 1; but when the tire is made without said flange D the heads of the bolts should be alternately one on each side of the wheel, as represented in Fig. 2.

E is the bolt, which is made with a head of such form as to allow of its being dovetailed into both the felly and the tire, and as to allow the outer surface of said head to be flush with the surface of the side of the wheel, as represented in the drawings.

By this arrangement the security of the attachment of the tire to the felly is greatly increased, and the head of the bolt being flush with the surface of the wheel, said bolt is protected from extraneous injury, and by this mode of construction the tire is attached to the wheel without in any manner weakening it in the middle of the tread, where its full strength is particularly desirable, which is a matter of great importance.

It will be observed that by making the recess in the tire in the form of a dovetail, and making the head of the bolt of a corresponding form, the bolt is made to retain the tire against lateral displacement in either direction, and it will also be observed that by extending dovetailed recess and the corresponding dovetailed section of the bolt into the felly of the wheel the strength and efficiency of the bolt is materially increased.

It will also be obvious that by making the bolt wedge shaped longitudinally an accurate fitting of the parts may be insured, and that, furthermore, the bolt will, when so constructed, have a tendency to hold the tire to the felly in case the said tire should by any accident be broken.

I claim as my invention—

1. The arrangement of the felly A, tire C, and bolt E, as described—that is to say, the bolts passing or extending into a notch in the edge or cheek of the tire and extending obliquely through the felly of the wheel, thereby securing the tire in position, as hereinabove set forth.

2. So constructing the tire C and the head of the bolt E that the latter shall be dovetailed into the former, so as to resist lateral pressure in either direction, as set forth.

3. The combination of the longitudinally wedge-shaped section of the bolt E with a wedge-shaped recess in the tire, substantially as and for the purpose set forth.

4. The combination of a dovetailed recess in the felly A with a dovetailed recess in the tire C, and with a head so formed upon the bolt E as to fit both of said recesses, substantially as and to the effect above stated.

ROBERT HATRICK.

Witnesses:
 THOS. P. HOW,
 JAMES T. GRAHAM.